(12) United States Patent
Critsinelis et al.

(10) Patent No.: US 11,035,522 B2
(45) Date of Patent: Jun. 15, 2021

(54) SYSTEMS, DEVICES AND METHODS FOR PREVENTING OVERPRESSURIZATION OF SUBSEA EQUIPMENT AND FLOWLINES

(71) Applicant: Chevron U.S.A. Inc., San Ramon, CA (US)

(72) Inventors: Antonio Critsinelis, Kingwood, TX (US); Sid Mebarkia, Sugar Land, TX (US); Baha T. Tanju, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 157 days.

(21) Appl. No.: 16/217,174

(22) Filed: Dec. 12, 2018

(65) Prior Publication Data

US 2020/0191336 A1    Jun. 18, 2020

(51) Int. Cl.
   *F17D 1/00*    (2006.01)
   *F17D 5/00*    (2006.01)
   *G05D 16/20*   (2006.01)

(52) U.S. Cl.
   CPC .......... *F17D 5/00* (2013.01); *G05D 16/2013* (2013.01)

(58) Field of Classification Search
   CPC ........ F17D 1/20; F17D 5/00; F16L 55/02781; F16L 55/04; F16L 55/055; G05D 16/10; G05D 16/107
   See application file for complete search history.

(56) References Cited

U.S. PATENT DOCUMENTS

| | | | | |
|---|---|---|---|---|
| 2,258,469 A | * | 10/1941 | Podolsky | F16L 55/055 181/233 |
| 2,474,512 A | * | 6/1949 | Stephens | F16L 55/053 138/30 |
| 3,911,941 A | * | 10/1975 | Gerbic | F16L 55/04 137/115.22 |
| 5,391,209 A | * | 2/1995 | Pelkey | F17D 1/20 137/14 |
| 8,235,628 B2 | | 8/2012 | Lamison | |
| 2004/0017105 A1 | | 1/2004 | Suzuki et al. | |
| 2004/0149445 A1 | | 8/2004 | Appleford et al. | |
| 2005/0139138 A1 | | 6/2005 | DeVries et al. | |
| 2005/0252554 A1 | * | 11/2005 | Partridge | F17D 1/20 137/488 |
| 2007/0089418 A1 | * | 4/2007 | Shahroudi | F16L 55/04 60/734 |
| 2012/0160329 A1 | | 6/2012 | MacKenzie et al. | |
| 2014/0261778 A1 | | 9/2014 | Hamilton | |

* cited by examiner

*Primary Examiner* — Reinaldo Sanchez-Medina
(74) *Attorney, Agent, or Firm* — Jason M. Guerrero

(57) ABSTRACT

Disclosed are processes, devices and systems for preventing overpressurization of subsea production equipment and flowlines in which fluid passes through a high integrity pressure protection system (HIPPS). In embodiments, a container having a piston seal therein can be attached to the piping. In embodiments, a device having a piston seal therein and connected to a fluid receptacle can be attached to the piping. In the event of a pressure surge, fluid can be diverted to the container or the device, thereby lessening the pressure surge. In embodiments, the container or device includes a resetting force to return the piston seal to its original sealed position. The use of the systems disclosed improve the life of the HIPPS valve, protects subsea equipment and flowlines, and enables a length and/or a wall thickness of a fortified pipeline zone downstream of the HIPPS to be reduced.

13 Claims, 12 Drawing Sheets

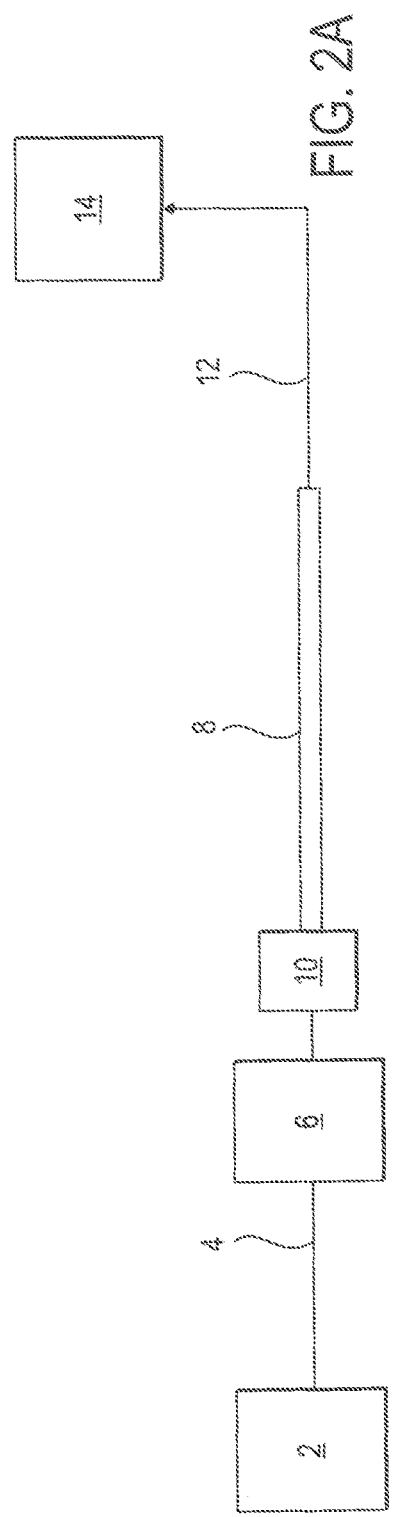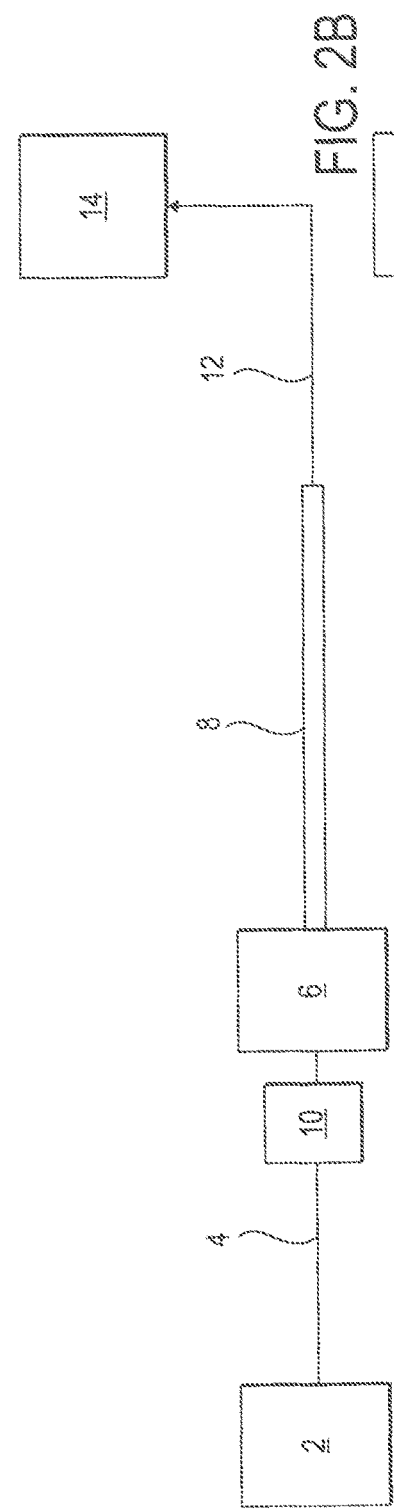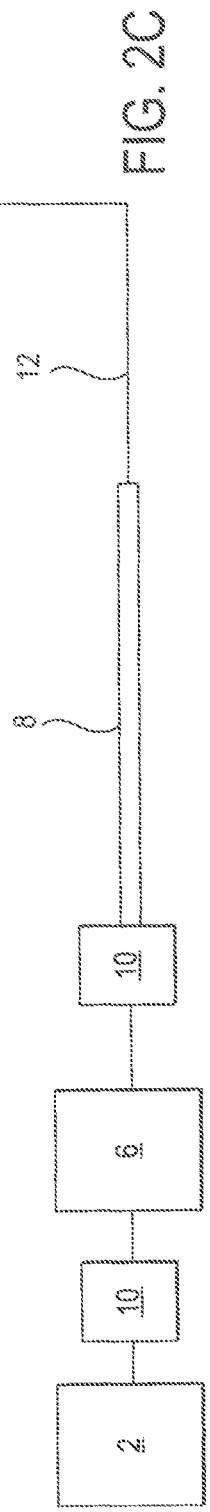

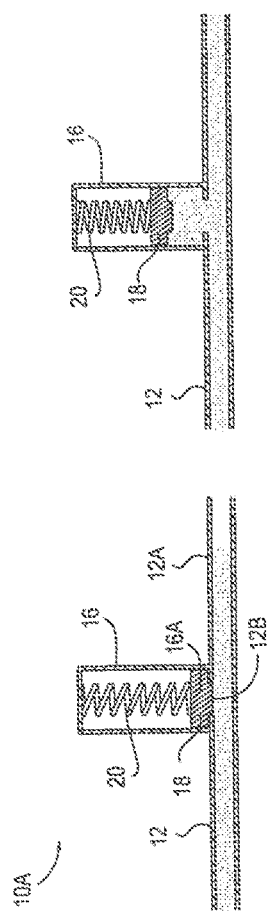
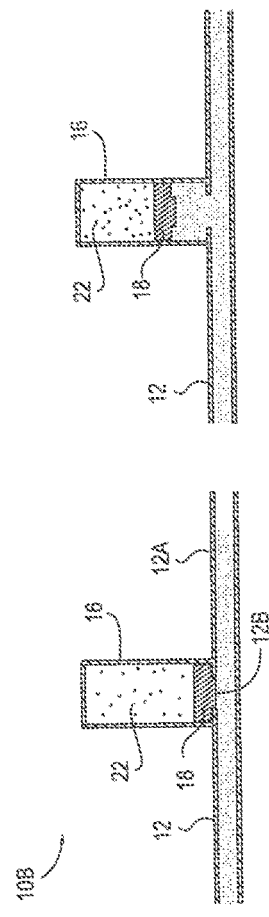
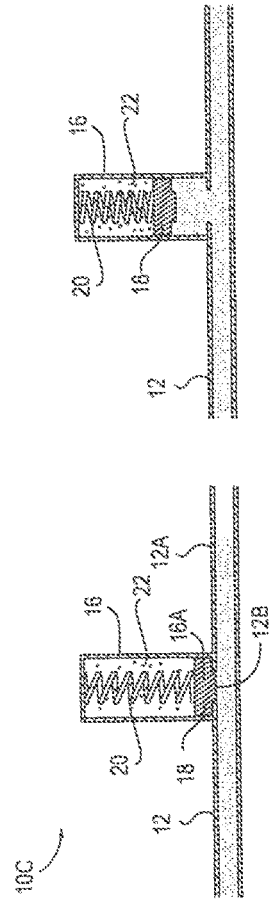

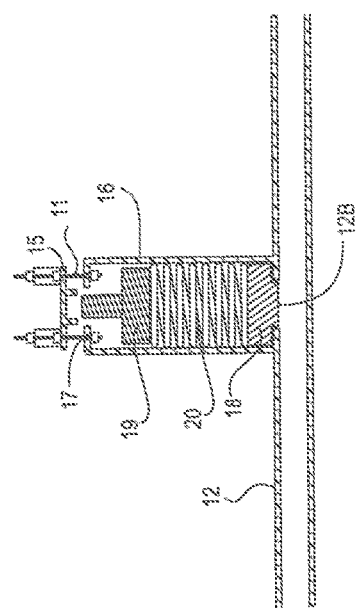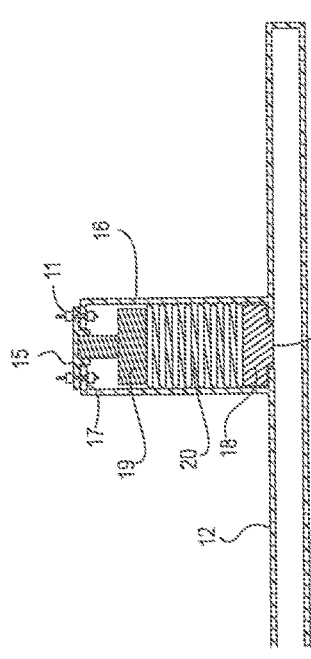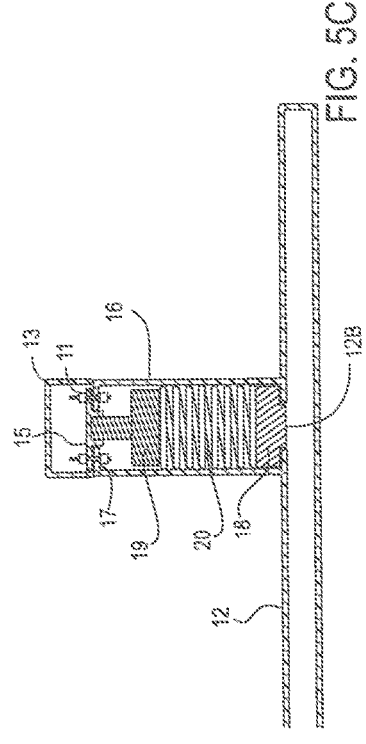

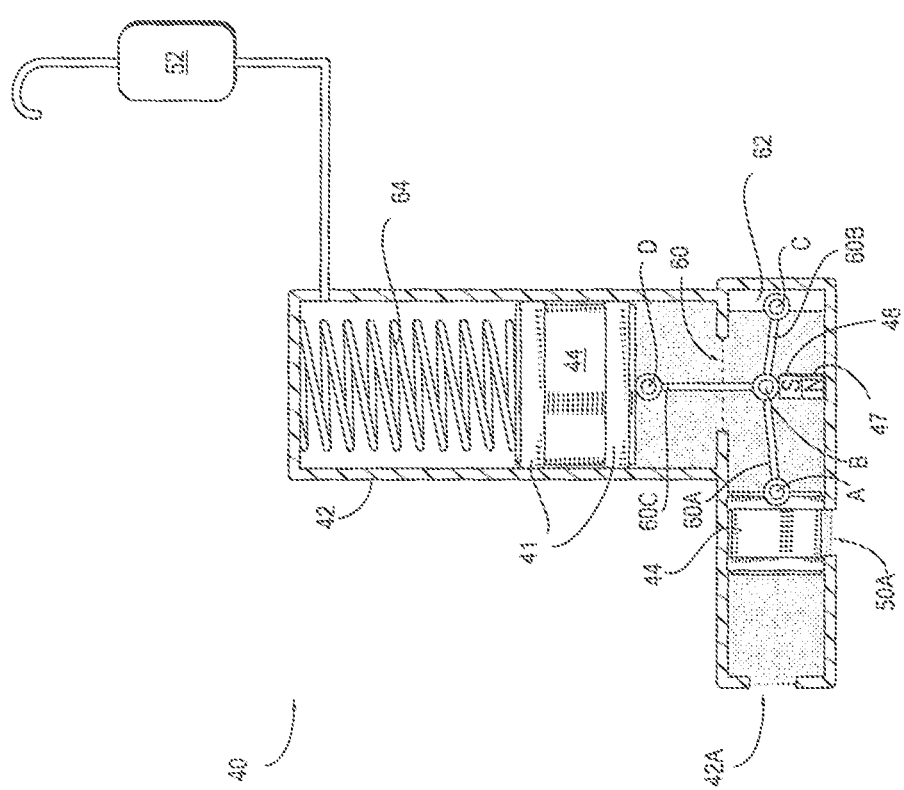

SYSTEMS, DEVICES AND METHODS FOR PREVENTING OVERPRESSURIZATION OF SUBSEA EQUIPMENT AND FLOWLINES

FIELD

The present disclosure relates to subsea production equipment and flowlines, and systems, devices and methods for preventing overpressurization of subsea production equipment and flowlines.

BACKGROUND

High integrity pressure protection systems (HIPPS) are safety instrumented systems built according to the International Electrotechnical Commission's International Standards IEC 61508 entitled "Functional safety of electrical/electronic/programmable electronic safety-related systems" and IEC 61511 entitled "Functional safety—Safety instrumented systems for the process industry sector" and designed to protect equipment downstream of the HIPPS, personnel and the environment from an overpressurization event. Subsea HIPPS are used in offshore oil and gas production to mitigate the risk of subsea flowline pressures exceeding tolerable pressure. The protection against excessive pressure is obtained by quickly isolating the source of a large increase in pressure. HIPPS include valves such as block valves capable of quickly shutting off flow through the high integrity pressure protection system (HIPPS), pressure sensors for detecting the pressure of fluid flowing through the HIPPS, actuators (pneumatic or hydraulic) for controlling the valves, and logic controllers for receiving information from the pressure sensors and sending signals to the actuators. HIPPS typically include redundant components for reliable operation. The term "HIPPS" is used throughout to refer to high integrity pressure protection systems, either in the singular or the plural. HIPPS have been used on topsides oil and gas production facilities for many years.

In the past several years, the use of HIPPS in subsea environments has become a viable option for a number of reasons. For one, in some cases, subsea equipment cannot be manufactured to the required pressure rating. In some situations, subsea flowline or pipeline having the required pressure rating cannot be installed using conventional installation techniques due to the heavy pipe and the thick wall thickness that would be required to withstand the maximum pressures encountered for a given oilfield. In the case of a long-distance tie-back, a HIPPS may enable use of optimized wall thickness pipe designed for lower pressure than the shut-in pressure, with a significant cost benefit and reduction of offshore installation risks given the pipe length required. In the case of a new high-pressure tie-in to existing subsea facilities, a HIPPS may be needed because the existing subsea facilities are rated for a significantly lower pressure than that of the new well or field. A HIPPS may also be called for when the cost of the HIPPS is lower than the cost of deploying pipeline at the required pressure rating or when a production facility without the HIPPS would be otherwise uneconomic.

Shut-in tubing pressure (SITP) is the maximum pressure that occurs during non-flowing conditions in a flowline system when exposed to full source pressure. Currently, typical subsea flowline systems have SITPs of less than 15,000 psi and design temperatures of less than 350° F. The technology qualification process for subsea production systems rated up to 20,000 psi is particularly lengthy and involved, as is the lead time for delivery of subsea equipment. Since operating pressure is generally much lower than SITP, a flowline system rated for SITP is inherently overdesigned for intended operating conditions.

FIG. 1 illustrates a prior art offshore oil and gas production facility including a drill center 2 having one or more subsea wells, a fully rated section of pipeline 4 connecting the drill center 2 to a HIPPS 6, a fortified section of pipeline 8 connected to the HIPPS 6 followed by a de-rated section of pipeline and riser 12 that delivers produced fluids to the production facility 14. The HIPPS 6 includes pressure sensors and transmitters 6A for measuring pressure and/or flow rate, and a logic solver 6B connected to the transmitters for determining whether an activation pressure or flow rate has been met. If the activation pressure or flow rate is met, an alarm 6D is typically activated, and the HIPPS valve(s) 6C is closed via the actuator 6E in communication with the logic solver 6B.

As shown in FIG. 1, immediately downstream of the HIPPS 6 is the fortified section, also referred to as a "fortified zone" 8, to protect the flowline and other equipment immediately downstream of the HIPPS 6 from rapid pressure increases which can occur as fluid passes through the HIPPS valves during the valve closure process. This is necessary since closure of the HIPPS valve is not instantaneous. The length of the fortified zone needed is based on the reaction time of the HIPPS valve when closing. This fortified zone 8 must be rated to full SITP in order to withstand the transient build-up pressure in case there is a blockage along the line. A fortified zone having a shorter length would be desirable since the fortified zone entails thick, heavy pipe walls, more complex fabrication and more onerous installation methods.

Despite the benefits offered by HIPPS technology, there remain drawbacks to HIPPS that have not successfully been addressed to date and are particularly prominent in oil-producing systems. For one thing, the faster the required closure time of the HIPPS valve, the more complex the HIPPS system needs to be in order to achieve rapid closure with the necessary extremely high degree of reliability. The HIPPS valve must close before the system pressure rises above the design pressure at the end of the subsea fortified zone 8. For another thing, the length of the fortified zone 8 that is required using known technology can often result in high cost and complex design, fabrication and installation requirements.

It would be desirable to have an improved method and system for preventing overpressurization of subsea equipment and flowlines, i.e., thereby lessening pressure increase, in a simpler, less costly way. It would further be desirable to have a technology that would allow the length of the fortified zone to be reduced, enabling the use of lower cost pipeline, as well as simpler welding, manufacturing and installation requirements. It would also be desirable to have a technology that would allow the required closure time of the HIPPS valve to be lengthened, thereby reducing cost and complexity of the HIPPS valve(s).

SUMMARY

In one aspect, a system is provided for preventing overpressurization of piping for transporting fluid produced from a pressure source to a receiving facility. The piping includes a piping wall. The fluid is directed from the pressure source through the piping to a high integrity pressure protection system (HIPPS) located between the pressure source and the receiving facility. The system includes a container having a container opening that can be aligned with and securely attached to a piping wall opening in the piping wall downstream or upstream of the HIPPS such that the container can be placed in fluid communication with the interior of the piping and wherein the container is detachable and retrievable. A piston seal is positioned within the container capable of completely blocking the container opening in a sealed position and movable between a first position and a second position within the container. A source of force acts on the piston seal from within the container to ensure the piston seal remains in the sealed position thereby preventing fluid from the interior of the piping from entering the container at fluid pressures up to a predetermined threshold pressure greater than or equal to the HIPPS activation pressure, such that when fluid being transported within the piping exceeds the predetermined threshold pressure, the piston seal is temporarily and reversibly displaced from the sealed position and fluid from within the piping is permitted to partially fill the container and a fluid pressure increase within the piping is consequently lessened. As a result, a required valve closure time period to shut off flow in the piping in response to the pressure surge of the HIPPS valve can be increased, a number of activations of the HIPPS can be reduced, a life of the HIPPS valve can be lengthened, a length of a fortified pipeline zone located immediately downstream of the HIPPS can be reduced, and/or a wall thickness of the fortified pipeline zone can be reduced.

In another aspect, a system is provided for preventing overpressurization of piping for transporting produced fluid from the pressure source to the receiving facility. The system includes a device for redirecting the produced fluid from the piping to a fluid receptacle in response to a pressure surge. The device includes an enclosure having an enclosure wall having a pipeline port capable of being aligned with and attached to a piping wall opening in the piping wall and a receptacle port capable of being placed in fluid communication with the fluid receptacle. The device further includes a piston seal positioned within the enclosure capable of moving between at least a first position for blocking the receptacle port and a second position for opening the receptacle port and allowing fluid communication between the piping and the fluid receptacle. The device further includes a source of force acting on the piston seal from within the enclosure to ensure the piston seal remains in the first position thereby preventing fluid from the interior of the piping from entering the fluid receptacle at fluid pressures up to a predetermined threshold pressure greater than or equal to the HIPPS activation pressure, such that when fluid being transported within the piping exceeds the predetermined threshold pressure, the piston seal is temporarily and reversibly displaced from the first position to the second position and fluid from within the piping is permitted to flow into the fluid receptacle and a fluid pressure increase within the piping is consequently lessened. The device further includes two magnetic components magnetically attracted to each other for providing a magnetic resetting force to return the piston seal from the second position to the first position after the piston seal is temporarily and reversibly displaced. First of the two magnetic components is connected at a fixed distance to the piston seal and a second of the two magnetic components is rigidly connected to the enclosure. The fluid receptacle is in fluid communication with the receptacle port of the enclosure for receiving fluid from within the piping. As a result, a required valve closure time period to shut off flow in the piping in response to the pressure surge of the HIPPS valve can be increased, a number of activations of the HIPPS can be reduced, a life of the HIPPS valve can be lengthened, a length of a fortified pipeline zone located immediately downstream of the HIPPS can be reduced, and/or a wall thickness of the fortified pipeline zone can be reduced.

In another aspect, a method is provided for preventing overpressurization of piping for transporting fluid produced from the pressure source to the receiving facility. The method includes providing a container detachably attached to the piping wherein the container has an inner diameter and a container opening aligned with and securely attached to a piping wall opening in the piping wall downstream or upstream of the HIPPS such that the container is in fluid communication with the interior of the piping, a piston seal within the container capable of completely blocking the container opening in a sealed position and movable between a first position and a second position within the container, and a source of force acting on the piston seal from within the container to ensure the piston seal remains in the sealed position thereby preventing fluid from the interior of the piping from entering the container at fluid pressures up to a predetermined threshold pressure greater than or equal to the HIPPS activation pressure. Fluid is transported within the piping from the pressure source to the receiving facility, wherein if the fluid being transported within the piping exceeds the predetermined threshold pressure, the piston seal is temporarily and reversibly displaced from the sealed position and fluid from within the piping is permitted to partially fill the container, thereby lessening a fluid pressure increase within the piping, increasing a required valve closure time period to shut off flow in the piping in response to the pressure surge of the HIPPS valve, reducing a number of activations of the HIPPS, reducing a length of a fortified pipeline zone located immediately downstream of the HIPPS, and/or reducing a wall thickness of the fortified pipeline zone.

In yet another aspect, a method is provided for preventing overpressurization of piping for transporting fluid produce from the pressure source to the receiving facility. The method includes providing the device described above, providing the fluid receptacle described above in fluid communication with the receptacle port of the enclosure for receiving fluid from within the piping, and transporting fluid within the piping from the pressure source to the receiving facility. If the fluid being transported within the piping exceeds the predetermined threshold pressure, the piston seal is temporarily and reversibly displaced from the sealed position and fluid from within the piping is permitted to partially fill the container, thereby lessening a fluid pressure increase within the piping, increasing a required valve closure time period to shut off flow in the piping in response to the pressure surge of the HIPPS valve, reducing a number of activations of the HIPPS, reducing a length of a fortified pipeline zone located immediately downstream of the HIPPS, and/or reducing a wall thickness of the fortified pipeline zone.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

FIGS. 2A-2C are schematic diagrams illustrating an oil and gas production facility according to three exemplary embodiments.

FIGS. 3A-3F are schematic diagrams illustrating 3 alternative containers for use in the oil and gas production facility of FIG. 2.

FIGS. 5A-5C are schematic diagrams illustrating a sequence for using another exemplary embodiment.

FIGS. 9-13 are alternative embodiments of devices for use in the oil and gas production facility of FIG. 8.

DETAILED DESCRIPTION

Figure 1:
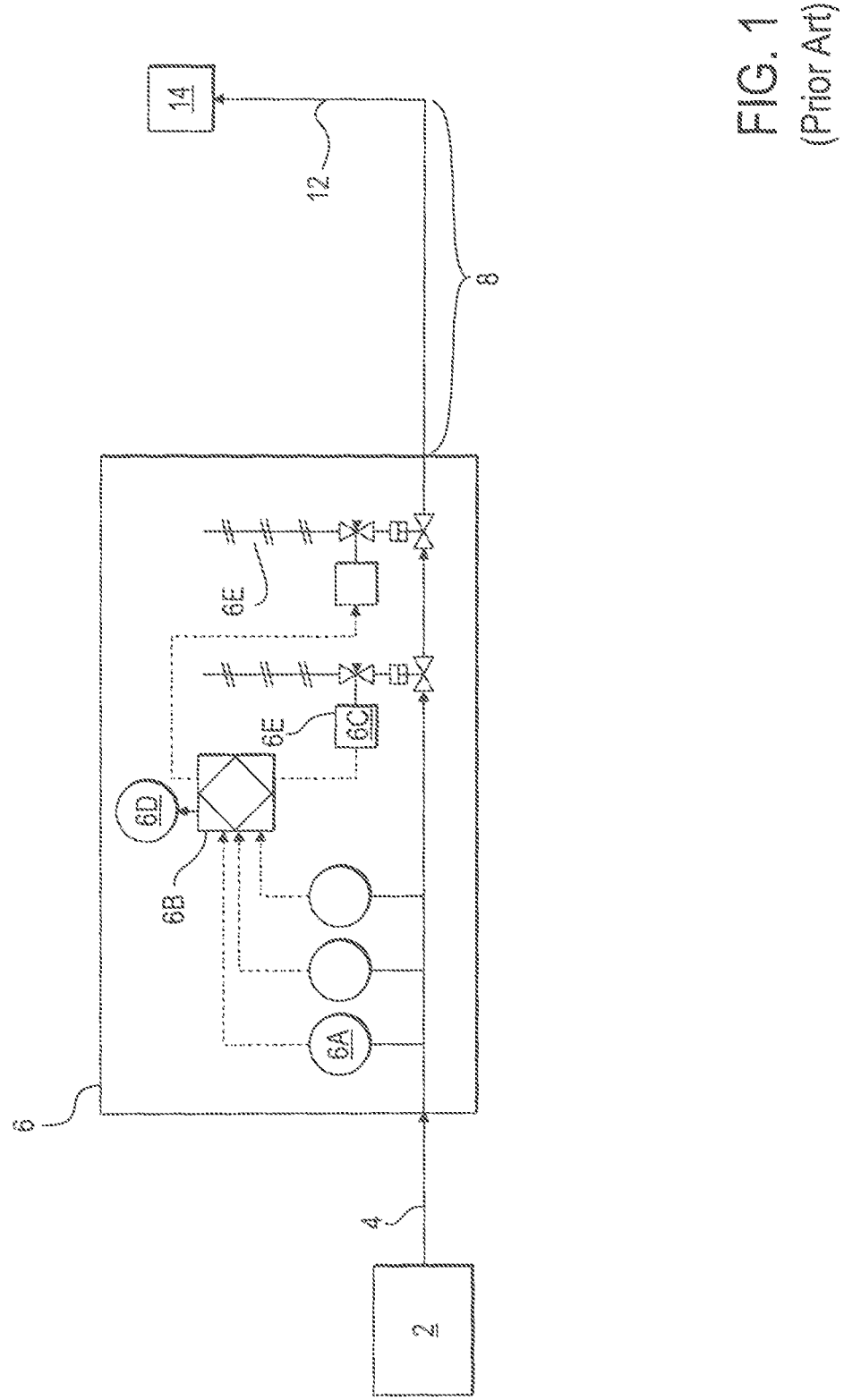
FIG. 1 is a schematic diagram illustrating an oil and gas production facility utilizing a high integrity pressure protection system according to the prior art.

Embodiments of processes and systems will now be described for preventing overpressurization of piping transporting fluid from a pressure source to a receiving facility.

As used herein, the terms "production facility," "receiving facility" and "facility" are used interchangeably to refer to facilities used for the production of oil and/or gas, including but not limited to one or more separators, treating and processing equipment, storage areas and tanks, and related facilities.

As used herein, the term "pressure source" may refer to any subsea source of fluid that may reach an elevated pressure, such as a subsea oil and gas producing well, a subsea pump, a subsea compressor, or the like.

By "elevated pressure" is meant a fluid pressure that is higher than a design fluid pressure for a given pipeline system or production facility. The fluid pressure may be at elevated pressure for a number of reasons, including but not limited to a blockage in the pipeline system downstream of the pressure source, a pressure surge from the pressure source, also referred to herein as a positive pressure transient, and a sudden unintended closure of a valve downstream in the pipeline system.

As used herein, the term "fluid" may refer to a gas, a liquid, a dense phase fluid and combinations thereof.

As used herein, the terms "piping," "flowline," and "pipeline" are used interchangeably to refer to pipe useful in transporting produced oil and gas from a pressure source to a production facility. Suitable pipe can include steel pipe, composite pipe and flexible pipe. In all embodiments herein, the piping 12 can be any of a pipeline, a jumper, a pipeline end termination, and a manifold.

As used herein, the terms "high integrity pressure protection system" and "HIPPS" are used interchangeably to refer to a system for use in a section of piping that includes a pressure sensor, a valve and a control system for detecting a pressure surge in the piping greater than a HIPPS shut-in pressure and for closing the valve over a time period to shut off flow in the piping in response to the pressure surge.

As used herein, the terms "fortified piping zone," fortified pipeline zone," "fortified section" and "fortified zone" are used interchangeably to refer to piping that is rated for a maximum source pressure or shut-in pressure and having a length based on the reaction time of the HIPPS valve when closing and an associated pressure surge above a HIPPS activation pressure caused by excess fluid traveling through the HIPPS valve during closure and filling the finite volume of the downstream pipeline.

In a number of embodiments, referring to FIGS. 2A-2C, a pressure relief system 10 is provided for preventing overpressurization of piping 12 for transporting fluid produced from a pressure source 2 to a receiving facility 14. The piping 12 includes a piping wall 12A. The fluid is directed from the pressure source 2 through the piping 12 to a high integrity pressure protection system (HIPPS) 6 located between the pressure source 2 and the receiving facility 14.

As described above with reference to FIG. 1, the offshore oil and gas production facility in which a pressure relief system 10 is utilized includes a drill center 2 having one or more subsea wells, also referred to herein as a pressure source 2, a fully rated section of pipeline 4 connecting the pressure source 2 to a HIPPS 6, a fortified section of pipeline 8 connected to the HIPPS 6 followed by a de-rated section of pipeline and riser 12 that delivers produced fluids to the production facility 14. Downstream of the HIPPS 6 is the fortified section, also referred to as a "fortified zone" 8, to protect the flowline and other equipment downstream of the HIPPS 6 from rapid pressure increases which can occur as fluid passes through the HIPPS valves during the valve closure process. The HIPPS 6 includes the known components of a HIPPS, including pressure sensors and transmitters 6A for measuring pressure and/or flow rate, and a logic solver 6B connected to the transmitters for determining whether an activation pressure or flow rate has been met. If the activation pressure or flow rate is met, an alarm 6D is typically activated, and the HIPPS valve(s) 6C is closed via the actuator 6E in communication with the logic solver 6B.

As shown in FIG. 2A, the pressure relief system 10 can be provided in the pipeline system in fluid communication with the HIPPS 6, downstream of the HIPPS 6. In this embodiment, when the HIPPS 6 is triggered, the pressure relief system 10 is activated. This enables a shortened fortified zone 8. As shown in FIG. 2B, the pressure relief system 10 can be provided in the pipeline system in fluid communication with the HIPPS 6, upstream of the HIPPS 6. In this embodiment, the number of instances of the HIPPS 6 being triggered is reduced. As shown in FIG. 2C, the pressure relief system 10 can be provided in the pipeline system both upstream and downstream of the HIPPS 6. In this embodiment, the benefits of both a shorter fortified zone 8 and a reduction in triggers of the HIPPS 6 can be realized.

As shown in FIG. 3, three alternative embodiments of the pressure relief system 10, 10A, 10B and 10C, are shown. In all three alternative embodiments, the pressure relief system 10 includes a container 16 having a container opening 16A that can be aligned with and securely attached to a piping wall opening 12B in the piping wall downstream, upstream, or both downstream and upstream of the HIPPS 6 such that the container 16 can be placed in fluid communication with the interior of the piping 12 and wherein the container 16 is detachable and retrievable. In one embodiment, the container 16 can be pressure-compensated. The container 16 has sufficient volume such that, upon the start of the closure of the HIPPS valve 6C in response to the pressure surge, a portion of the fluid passing through the HIPPS 6 during the valve closure time period is absorbed by the container 16. As a result, pressure increase in the pipeline of the system downstream of the HIPPS 6 (e.g. including sections 8 and 12) is lessened. In other words, pressure surges or spikes in the pipeline system can be mitigated. Pressure increase or build-up in terms of magnitude and/or rate of pressure increase can be mitigated. The container 16 can have a volume of from 0.1 barrel to 1000 barrels. The container 16 can be formed of any suitable material having sufficient strength and durability, such as steel or a composite material.

A piston seal 18 is positioned within the container 16. The piston seal 18 is capable of completely blocking the container opening 16A in a sealed position. The piston seal 18 is movable between a first position and a second position within the container 16. A source of force acts on the piston seal 18 from within the container to ensure the piston seal remains in the sealed position thereby preventing fluid from the interior of the piping 12 from entering the container 16 at fluid pressures up to a predetermined threshold pressure greater than or equal to the HIPPS activation pressure. In one embodiment, shown as 10A, the source of force acting on the piston seal 18 from within the container can be a spring 20. When the source of force is a spring 20, suitable springs include Belleville springs, metallic coil springs and elastomeric material coil springs. In one embodiment, shown as 10B, the source of force acting on the piston seal 18 from within the container can be a compressible fluid 22. In one embodiment, shown as 10C, the source of force acting on the piston seal 18 from within the container can be a combination of a spring 20 and a compressible fluid 22.

Figure 4A:
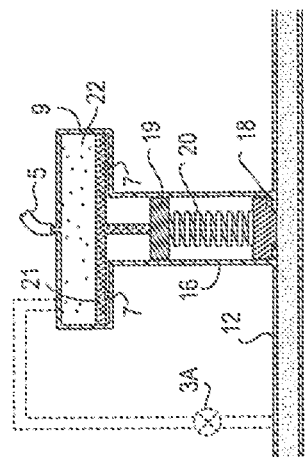
FIGS. 4A-4C are schematic diagrams illustrating a sequence for using another exemplary embodiment.
Figure 4B:
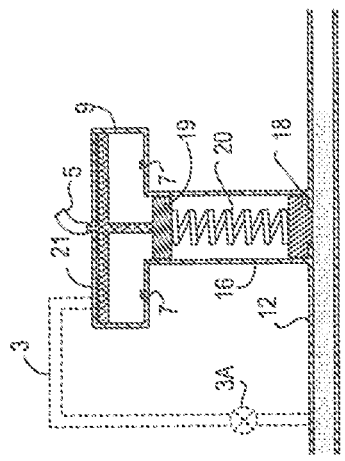
Figure 4C:
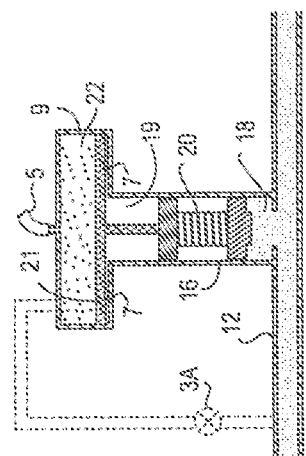

In one embodiment, shown in FIG. 4, the container 16 has a plate seal 21 having a surface capable of having fluid having a hydrostatic pressure applied thereto before displacing the piston seal 18 from the sealed position to compress spring 20. In one embodiment, the source of force acting on the piston seal 18 is the unpreloaded spring 20 prior to the piston seal 18 being displaced from the sealed position. The unpreloaded spring 20 has a first end connected to the piston seal 18 and a second end connected to a second piston seal 19. The plate seal 21 has a surface capable of having fluid having a hydrostatic pressure applied thereto, e.g., compressible fluid 22, and is connected to the second piston seal 19. The unpreloaded spring 20 is capable of being preloaded by compressing the unpreloaded spring 20 by applying force to the plate seal 21 and thereby also to the second end of the unpreloaded spring 20. A chamber 9 having an inner diameter greater than the inner diameter of the container 16 is attached as shown for receiving the compressible fluid 22. The plate seal 21 is within the chamber 9 and the plate seal 21 is displaced from a first position within the chamber to a second position within the chamber upon application of the compressible fluid 22 to the surface of the plate seal 21. A lock 7 can be provided within the chamber 9 for locking the plate seal 21 in the second position. An umbilical or flying lead 5 can optionally be connected to the chamber 9 for supplying the compressible fluid 22 to be applied to the surface of the plate seal 21.

In one embodiment, an optional fluid line 3 connects the chamber 9 to the piping 12 at a location upstream of the piping wall opening 12B, the fluid line having a check valve 3A to allow fluid flow in one direction from the piping 12 to the chamber 9. The second piston seal 19 is reversibly movable between a first position and a second position within the container 16. The second piston seal 19 has a diameter such that the second piston seal 19 substantially fills the inner diameter of the container 16. During operation of the system, when a pressure of the fluid flowing in the piping 12 is up to a maximum operating pressure, while the piston seal 18 remains in the sealed position, fluid flowing in the piping 12 flows through the fluid line 3 into the chamber 9. As fluid flows into the chamber 9, the plate seal 21 is forced into the second position and the second piston seal 19 is in turn forced down thereby compressing the spring 20 and/or the compressible fluid 22.

In various embodiments, because of the use of the pressure relief system 10, when fluid being transported within the piping 12 exceeds the predetermined threshold pressure, the piston seal 18 is temporarily and reversibly displaced from the sealed position and fluid from within the piping 12 is permitted to partially fill the container 16. Consequently, a fluid pressure increase within the piping 12 is lessened. As a result, a required valve closure time period of valve 6C to shut off flow in the piping 12 in response to the pressure surge of the HIPPS valve 6C can be increased. Furthermore, a number of activations of the HIPPS 6 can be reduced, a life of the HIPPS valve 6C can be lengthened, a length of a fortified pipeline zone 8 located immediately downstream of the HIPPS 6 can be reduced, and/or a wall thickness of the fortified pipeline zone 8 can be reduced. After the pressure surge subsides in the pipeline 12, the piston seal 18 returns to its original, sealed position.

In one embodiment, shown in FIG. 5, the source of force acting on the piston seal 18 is a preloaded spring 20. the second piston seal 19 within the container 16 can be used to preload the spring 20 before installation on the piping 12. The container 16 can have an open end having a flange 17. A plate 15 can be bolted to the flange 17. A cap 13 can be welded to the flange 17 to protect the flange 17, plate 15 and bolts 11 from corrosion during use in seawater.

Figure 6:
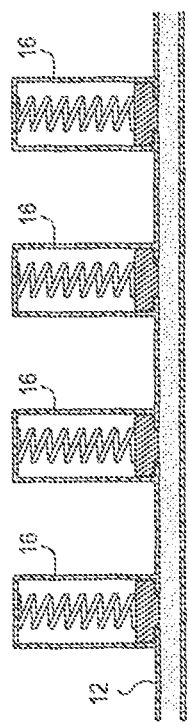
FIG. 6 is a schematic diagram illustrating another exemplary embodiment.

In one embodiment, shown in FIG. 6, multiple containers 16 can be used and securely attached to the piping 12 wherein each container 16 has a container opening capable of being aligned with a piping wall opening such that each container can be placed in fluid communication with the interior of the piping 12. The multiple containers 16 can be configured to have the same or different predetermined threshold pressures.

Figure 7A:
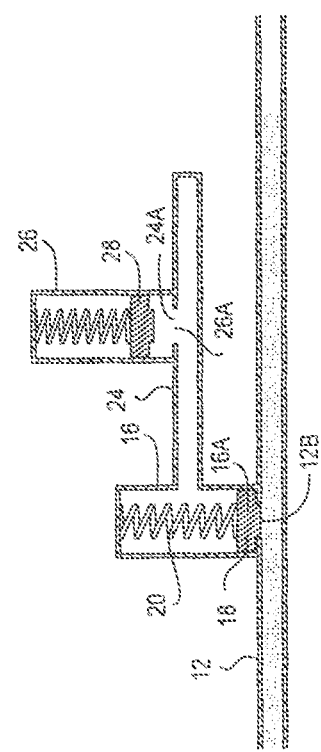
FIGS. 7A-7B are schematic diagrams illustrating other exemplary embodiments.
Figure 7B:
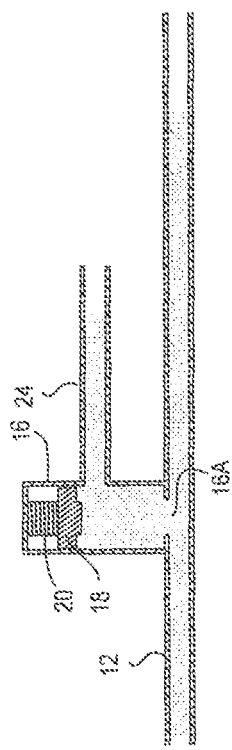

In one embodiment, shown in FIG. 7A, a first container 16 has an outlet line 24 connected to and in fluid communication with a second container 26 such that the second container 26 is daisy chained with the first container 16. The second container 26 has a second container opening 26A aligned with an opening 24A in the outlet line 24, a second piston seal 28 positioned within the second container 26 capable of completely blocking the second container opening 26A in a sealed position and movable between a first position and a second position within the second container 26, and a source of force acting on the second piston seal 28 from within the second container 26 to ensure the second piston seal 28 remains in the sealed position thereby preventing fluid from the interior of the outlet line 24 from entering the second container 26 at fluid pressures up to a second predetermined threshold pressure, such that when fluid in the outlet line 24 exceeds the second predetermined threshold pressure, the second piston seal 28 is displaced from the sealed position and fluid from within the outlet line 24 is permitted to partially fill the second container 26 in the event that an excess volume entering the piping 12 during the valve closure time period (of HIPPS valve 6C) is too large for the container 16 to hold. In one embodiment, shown in FIG. 7B, the outlet line 24 can be a service line or a tie in to a service line or a short pipeline segment specifically designed to contain the additional discharge.

Figure 8:
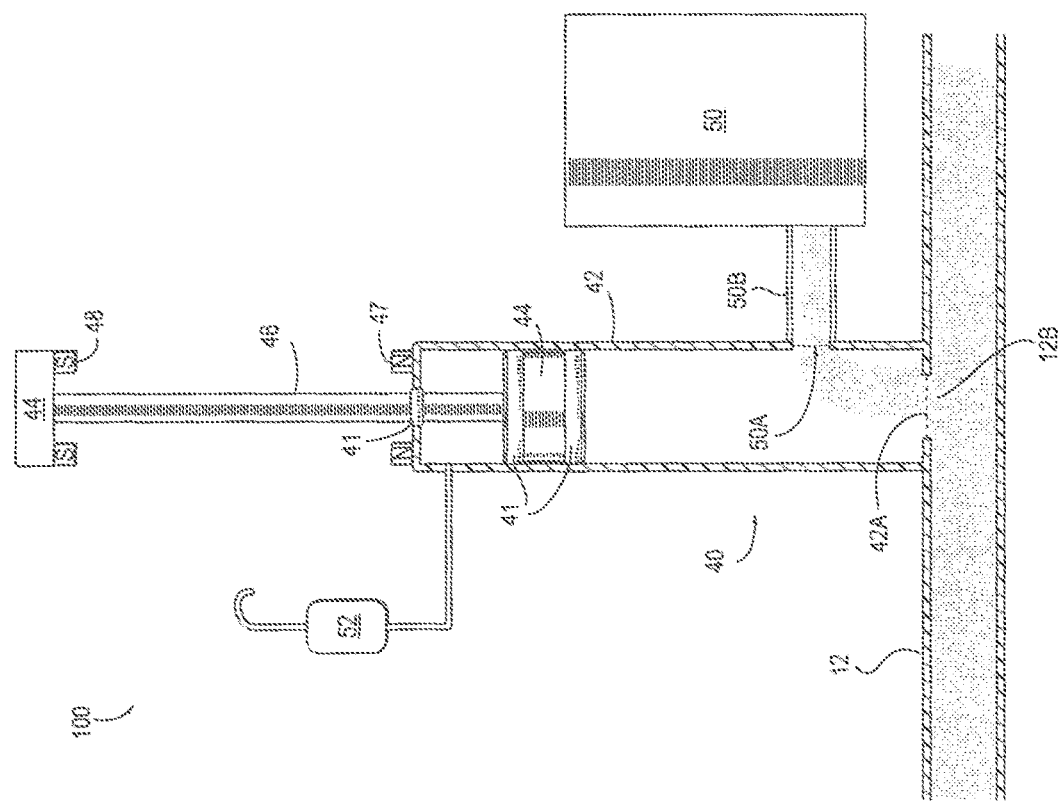
FIG. 8 is a schematic diagram illustrating an oil and gas production facility according to another exemplary embodiment.

In a number of embodiments, referring to FIG. 8, another system 100 for preventing overpressurization of piping 12 is disclosed. As above, the piping 12 carries fluid from the pressure source 2 through the piping to a HIPPS 6 located between the pressure source 2 and a receiving facility 14, the HIPPS 6 including a pressure sensor 6A, a HIPPS valve 6C and a control system 6B for detecting a pressure surge in the piping greater than a HIPPS activation pressure and for closing the HIPPS valve 6C over a valve closure time period to shut off flow in the piping 12 in response to the pressure surge. The system 100 utilizes a device 40 for redirecting the produced fluid from the piping 12 to a fluid receptacle 50 for receiving fluid from within the piping 12 in response to the pressure surge. The device 40 includes an enclosure 42 having an enclosure wall having a pipeline port 42A capable of being aligned with and attached to a piping wall opening 12B in the piping wall and a receptacle port 50A capable of being placed in fluid communication with the fluid receptacle 50, optionally via a connecting line 50B. The upper side of the piston 41 enclosed in 42 can be pressure-compensated, e.g., by using a compensator 52. The compensator 52 is optional when the source of resetting force is compressed gas. The enclosure 42 can be formed of any suitable material having sufficient strength and durability, such as steel or a composite material.

The device 40 includes a piston seal 44 positioned within the enclosure 42 capable of moving between at least a first position for blocking the receptacle port 50A and a second position for opening the receptacle port 50A and allowing fluid communication between the piping 12 and the fluid receptacle 50. The piston seal 44 can be connected to rod 46. Seals 41 can be used. A source of force is provided for acting on the piston seal 44 from within the enclosure 42 to ensure the piston seal 44 remains in the first position thereby preventing fluid from the interior of the piping 12 from entering the fluid receptacle 50 at fluid pressures up to a predetermined threshold pressure greater than or equal to the HIPPS activation pressure. When fluid being transported within the piping 12 exceeds the predetermined threshold pressure, the piston seal 44 is temporarily and reversibly displaced from the first position to the second position and fluid from within the piping 12 is permitted to flow into the fluid receptacle 50 and a fluid pressure increase within the piping 12 is consequently lessened. Furthermore, two magnetic components 47 and 48 magnetically attracted to each other are provided for providing a magnetic resetting force to return the piston seal 44 from the second position to the first position after the piston seal 44 is temporarily and reversibly displaced. A first of the two magnetic components 48 is connected at a fixed distance to the piston seal 44 and a second of the two magnetic components 47 is rigidly connected to the enclosure 42.

The fluid receptacle 50 can have a volume of from 0.1 barrel to 1000 barrels. The fluid receptacle 50 can be formed of steel, a composite material or a polymeric material. In one embodiment, the fluid receptacle 50 can be a bladder made from a flexible material having sufficient volume and flexibility to allow for expansion when the bladder is filled or partially filled with liquid. For example, such material can include aramid fibers, graphene sheets or layers of sheets, nitrile rubber, neoprene, poly(vinyl chloride), polyurethane and combinations thereof. Once the fluid receptacle 50 is filled or partially filled, any of several alternative means of disposing the fluid are possible. In one embodiment, fluid from the fluid receptacle 50 can be returned to the piping 12 through an optional return line (not shown). In one embodiment, fluid from the fluid receptacle 50 can be flowed directly to the receiving facility 14 through an optional line (not shown). In one embodiment, fluid from the fluid receptacle 50 can be recovered with the use of a remotely operated vehicle or a diver (not shown). In one embodiment, the fluid receptacle 50 can be recovered to a topsides facility.

Figure 9:
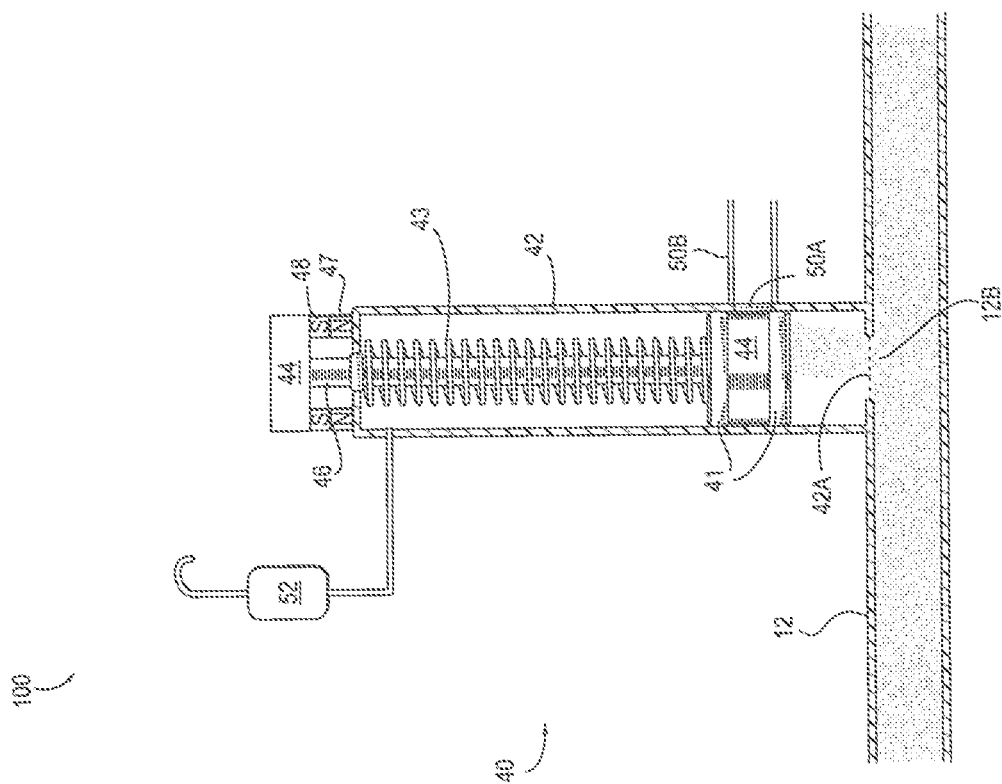

The device 40 includes a source of resetting force to reset the piston seal 44 to its original position. In one embodiment, as shown in FIG. 9, the device 40 further includes a spring 43 in the enclosure 42 around the rod 46 to provide the resetting force.

Figure 10:
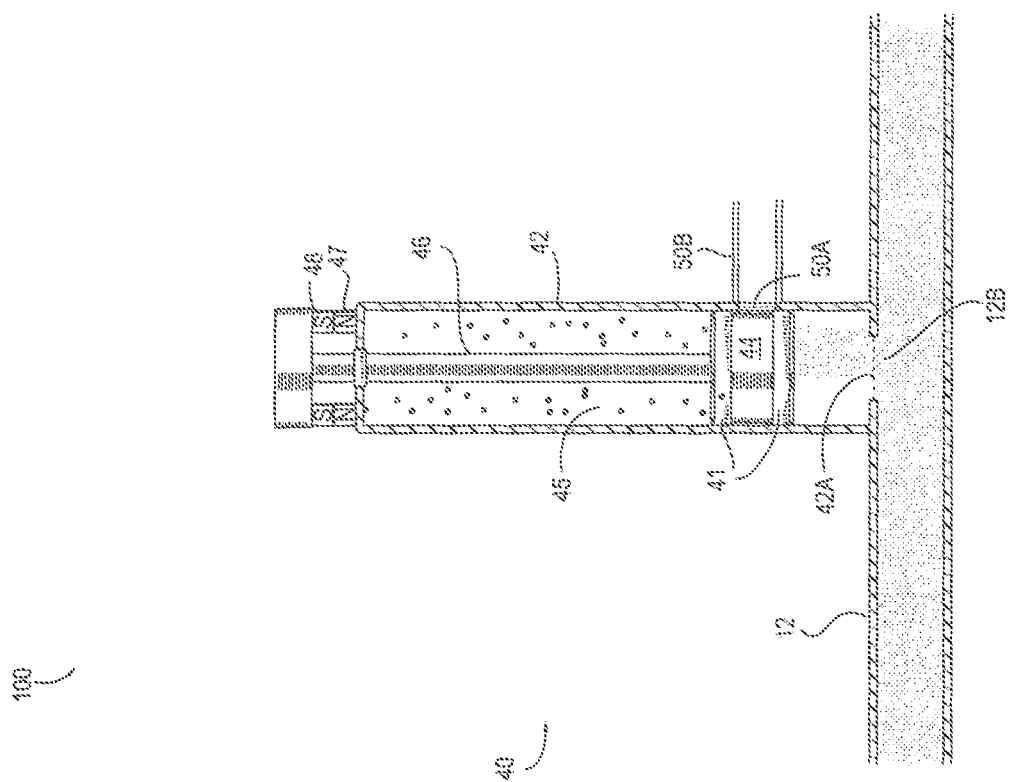

In one embodiment, as shown in FIG. 10, the device 40 further includes a compressed fluid 45 in the enclosure 42 to provide the resetting force.

Figure 11:
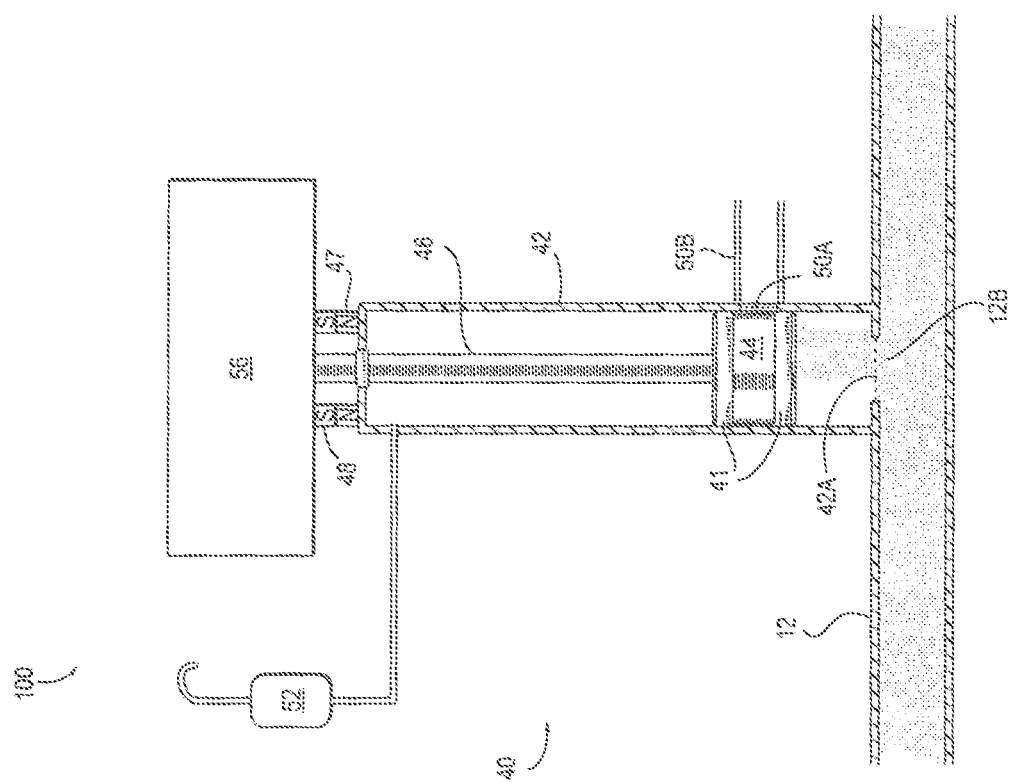

In one embodiment, as shown in FIG. 11, the device 40 further includes a dead weight 56 connected to magnetic component 48 for providing a further gravity-driven resetting force to return the piston seal 44 from the second position to the first position after the piston seal 44 is temporarily and reversibly displaced. The piston seal 44 moves down vertically to return to the first position because of the gravity-driven resetting force of the dead weight 56.

Figure 12:
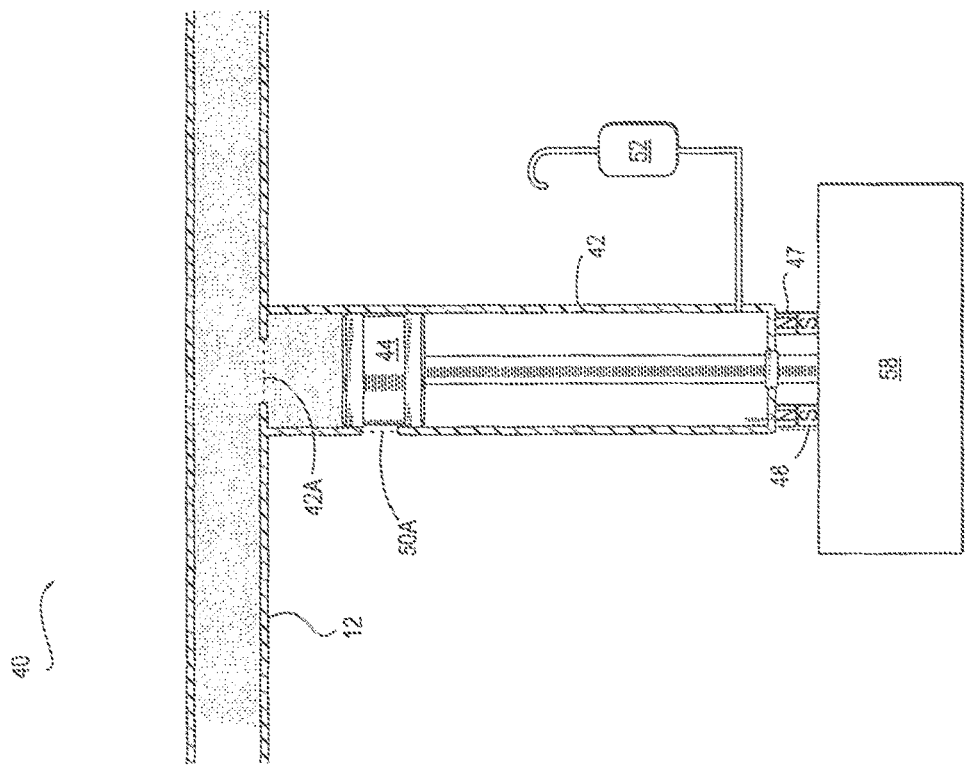

In one embodiment, as shown in FIG. 12, the device 40 further includes a buoyancy module 58. The buoyancy module 58 is less dense than water and is connected to the second of the two magnetic components 48 for providing a further buoyancy-driven resetting force to return the piston seal from the second position to the first position after the piston seal 44 is temporarily and reversibly displaced. The piston seal 44 moves up vertically to return to the first position because of the buoyancy-driven resetting force of the buoyancy module 58.

In one embodiment, as shown in FIG. 13, the device 40 further includes a buckling pin 60. The buckling pin 60 includes a first linkage 60A pivotally connected at a first end to the piston seal 44 at hinge A and at a second end to the first of the two magnetic components 48 and a second linkage 60B at hinge B. The second linkage 60B is pivotally connected at a first end to the first linkage 60A and to the first of the two magnetic components 48 at hinge B and at a second end to a structure 62 fixed within the enclosure wall 42 at hinge C. A third linkage 60C is pivotally connected at a first end to the second end of the first linkage 60A and the first end of the second linkage 60B at hinge B. The third linkage 60C has a second end D for receiving force from the source of resetting force, e.g., a spring 64 as shown. In alternative embodiments, rather than or in addition to a spring, the source of resetting force can be compressed gas, a dead weight or a buoyancy module as described elsewhere in other embodiments. In one embodiment, the second of the two magnetic components 47 is connected to the enclosure wall 42 between the receptacle port 50A and the structure 62 fixed within the enclosure wall 42.

Depending on the angles of the linkages of the buckling pin 60, the magnetic force required of magnetic components 47 and 48 to reset the device 40 can be lowered significantly.

Without wishing to be bound by theory, in embodiments utilizing magnets 47 and 48 to reset the device 40, a hysteresis on the movement of the piston 44 can be used to create an automatic resetting force in the device 40. For instance, as shown in FIG. 8, the magnets 47 can be fixed to the enclosure 42, and the magnets 48 can be fixed to the piston rod 46. The magnetic forces together with other resetting forces (e.g., a spring 46, compressed gas 45 or gravity driven forces applied using a dead weight 56 or a buoyancy module 58) provide a high resetting force in the direction from the first position toward the second position of the piston 44. In the opposite direction from the piston's second location toward the first location, the magnetic forces are negligible. The piston 44 will progress from the second position toward the first position mainly due to resetting forces (spring, compressed gas, gravity or buoyancy driven forces) until the piston 44 gets in close proximity of the first position, i.e., when the magnets 47 and 48 are in close proximity of each other. Thus, the required activation forces are considerably higher than resetting forces. The device 40 provides high activation pressure (although still lower than HIPPS activation pressure) to direct fluid to fluid receptacle 50. The device 40 requires pipeline pressure lower than the device resetting pressure after it is activated to automatically reset itself. The piston 44 starts to move to open the pipeline port 42A at a high pipeline pressure. After opening the pipeline port 42A, the piston 44 can move to close the pipeline port 42A at a much lower pressure. A hysteresis is thus created between valve open and close actions, the valve opening at high pressure and resetting at low pressure. The hysteresis will relieve the pipeline pressure to the receptacle 50 at high pressure and allow the enclosure 42 to drain and automatically reset at low pipeline pressure.

In embodiments of system 100, the magnetic components 47 and 48 can be neodymium magnets. When the magnets 47 and 48 are in contact with each other, it requires high pressure (activation pressure) from the pipeline 12 to move the piston 44 to open the pipeline port 42A. The resetting force is designed such that when pipeline pressure is lowered, the pipeline port 42A allows the enclosure 42 to drain to piping 12 and close the pipeline port 42A therefore trapping low pressure in the enclosure 42, and resetting the system 100 for the next high-pressure surge.

Advantageously, because of the use of the system 100, a required valve closure time period to shut off flow in the piping in response to the pressure surge of the HIPPS valve 6C can be increased, a number of activations of the HIPPS 6 can be reduced, a life of the HIPPS valve 6C can be lengthened, a length of a fortified pipeline zone 8 located immediately downstream of the HIPPS 6 can be reduced, and/or a wall thickness of the fortified pipeline zone 8 can be reduced.

In embodiments of both system 10 and system 100 disclosed herein, when the source of force acting on the piston seal (18 or 44) is a spring, the spring can be selected from a Belleville spring, a spring comprising a metallic coil and a spring comprising a coil of elastomeric material. In some embodiments, the spring is an unpreloaded spring prior to the piston seal being displaced from the sealed position.

In some embodiments, the pipeline exiting the HIPPS 6 consists of an initial fortified zone 8, also referred to as a fortified piping zone 8, followed by a combined section of de-rated pipeline and riser 12 between the fortified zone 8 and the production facility 14. Thus, fluid having passed through the HIPPS valve 6C during closing of the valve is directed through the fortified zone 8 and subsequently directed through the de-rated piping and riser 12. Advantageously, system embodiments of the present disclosure enable the use of a shorter (i.e., reduced length) fortified zone 8 and longer length of de-rated piping 12, thus simplifying installation and reducing cost of the piping between the HIPPS 6 and the production facility 14. Similarly, the wall thickness of the fortified pipeline zone can be reduced, also reducing the cost of the piping.

Advantageously, system embodiments of the present disclosure also enable the use of a longer (i.e., increased) closure time of the HIPPS valve 6C, thus simplifying the design and reducing the cost of the HIPPS valve 6C. When the closure time increases, the energy required to close the valve will be greatly reduced, significantly reducing the wear of the valve. For example, if the closure time increases by a factor of 2, the energy required to close the valve will be reduced by a factor of 4 because $E=\frac{1}{2}mv^2$. The use of a longer closure time of the HIPPS valve 6C can be implemented separately from, or in combination with, the shorter fortified zone 8. Furthermore, by using systems disclosed herein, a number of activations of the HIPPS 6 can be reduced, such that the life of the HIPPS valve 6C can be lengthened.

It should be noted that only the components relevant to the disclosure are shown in the figures, and that many other components normally part of a subsea oil and gas production facility and/or a HIPPS are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A system for preventing overpressurization of piping for transporting fluid produced from a pressure source to a receiving facility, wherein the piping comprises a piping wall defining an interior and wherein the fluid is directed from the pressure source through the piping to a high integrity pressure protection system (HIPPS) located between the pressure source and the receiving facility; the HIPPS comprising a pressure sensor, a HIPPS valve and a control system for detecting a pressure surge in the piping greater than a HIPPS activation pressure and for closing the HIPPS valve over a valve closure time period to shut off flow in the piping in response to the pressure surge, the system comprising:
 a container having an inner diameter wherein the container has a container opening that can be aligned with and securely attached to a piping wall opening in the piping wall downstream or upstream of the HIPPS such that the container can be placed in fluid communication with the interior of the piping and wherein the container is detachable and retrievable;
a piston seal positioned within the container capable of completely blocking the container opening in a sealed position and movable between a first position and a second position within the container; and
a source of force acting on the piston seal from within the container to ensure the piston seal remains in the sealed position thereby preventing fluid from the interior of the piping from entering the container at fluid pressures up to a predetermined threshold pressure greater than or equal to the HIPPS activation pressure, such that when fluid being transported within the piping exceeds the predetermined threshold pressure, the piston seal is temporarily and reversibly displaced from the sealed position and fluid from within the piping is permitted to partially fill the container and a fluid pressure increase within the piping is consequently lessened;
wherein by the use of the system, a required valve closure time period to shut off flow in the piping in response to the pressure surge of the HIPPS valve can be increased, a number of activations of the HIPPS can be reduced, a life of the HIPPS valve can be lengthened, a length of a fortified pipeline zone located immediately downstream of the HIPPS can be reduced, and/or a wall thickness of the fortified pipeline zone can be reduced.

2. The system of claim 1, wherein the source of force acting on the piston seal is selected from a spring, a compressible fluid and a combination thereof.

3. The system of claim 2, wherein the spring is selected from a Belleville spring, a spring comprising a metallic coil and a spring comprising a coil of elastomeric material.

4. The system of claim 1, further comprising the piping selected from the group consisting of a pipeline, a jumper, a pipeline end termination, and a manifold.

5. The system of claim 1, wherein the container is pressure-compensated.

6. The system of claim 1, wherein the container comprises an outlet line connected to and in fluid communication with a second container such that the second container is daisy chained with the container, wherein the second container has a second container opening aligned with an opening in the outlet line, a second piston seal positioned within the second container capable of completely blocking the second container opening in a sealed position and movable between a first position and a second position within the second container, and a source of force acting on the second piston seal from within the second container to ensure the second piston seal remains in the sealed position thereby preventing fluid from the interior of the outlet line from entering the second container at fluid pressures up to a second predetermined threshold pressure, such that when fluid in the outlet line exceeds the second predetermined threshold pressure, the second piston seal is displaced from the sealed position and fluid from within the outlet line is permitted to partially fill the second container in the event that an excess volume entering the piping during the valve closure time period is too large for the container to hold.

7. The system of claim 1, wherein the container has a volume of from 0.1 barrel to 1000 barrels.

8. A method for preventing overpressurization of piping for transporting fluid produced from a pressure source to a receiving facility, wherein the piping comprises a piping wall defining an interior and wherein the fluid is directed from the pressure source through the piping to a high integrity pressure protection system (HIPPS) located between the pressure source and the receiving facility; the HIPPS comprising a pressure sensor, a HIPPS valve and a control system for detecting a pressure surge in the piping greater than a HIPPS activation pressure and for closing the HIPPS valve over a valve closure time period to shut off flow in the piping in response to the pressure surge, the method comprising:
providing a container detachably attached to the piping wherein the container has an inner diameter and a container opening aligned with and securely attached to a piping wall opening in the piping wall downstream or upstream of the HIPPS such that the container is in fluid communication with the interior of the piping, a piston seal within the container capable of completely blocking the container opening in a sealed position and movable between a first position and a second position within the container, and a source of force acting on the piston seal from within the container to ensure the piston seal remains in the sealed position thereby preventing fluid from the interior of the piping from entering the container at fluid pressures up to a predetermined threshold pressure greater than or equal to the HIPPS activation pressure; and
transporting fluid within the piping from the pressure source to the receiving facility, wherein if the fluid being transported within the piping exceeds the predetermined threshold pressure, the piston seal is temporarily and reversibly displaced from the sealed position and fluid from within the piping is permitted to partially fill the container, thereby lessening a fluid pressure increase within the piping, increasing a required valve closure time period to shut off flow in the piping in response to the pressure surge of the HIPPS valve, reducing a number of activations of the HIPPS, reducing a length of a fortified pipeline zone located immediately downstream of the HIPPS, and/or reducing a wall thickness of the fortified pipeline zone.

9. The method of claim 8, wherein the HIPPS is located upstream of the container; such that the fluid is directed from the pressure source through the piping to the HIPPS.

10. The method of claim 8, wherein the source of force acting on the piston seal is selected from a spring, a compressible fluid and a combination thereof.

11. The method of claim 8, wherein the container is pressure-compensated.

12. The method of claim 8, wherein the container comprises an outlet line connected to and in fluid communication with a second container such that the second container is daisy chained with the container, wherein the second container has a second container opening aligned with an opening in the outlet line, a second piston seal positioned within the second container capable of completely blocking the second container opening in a sealed position and movable between a first position and a second position within the second container, and a source of force acting on the second piston seal from within the second container to ensure the second piston seal remains in the sealed position thereby preventing fluid from the interior of the outlet line from entering the second container at fluid pressures up to a second predetermined threshold pressure, such that when fluid in the outlet line exceeds the second predetermined threshold pressure, the second piston seal is displaced from the sealed position and fluid from within the outlet line is permitted to partially fill the second container in the event that an excess volume entering the piping during the valve closure time period is too large for the container to hold.

13. The method of claim 8, wherein the container has a volume of from 0.1 barrel to 1000 barrels.

\* \* \* \* \*